April 14, 1964     M. R. EUVERARD     3,128,558
WET FILM GAUGE
Filed Sept. 7, 1961
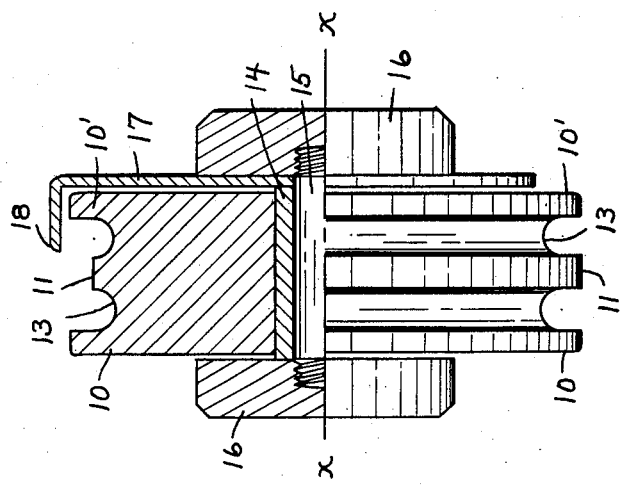
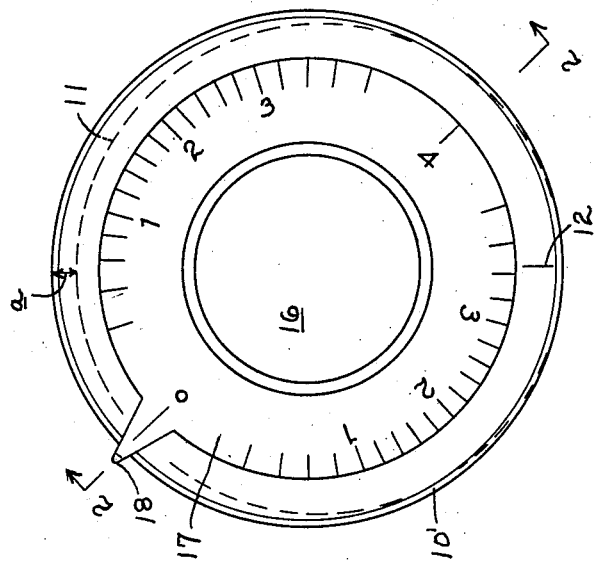
INVENTOR.
Maynard R Euverard
BY
Pierce, Scheffler & Parker
Attorneys

United States Patent Office 3,128,558
Patented Apr. 14, 1964

3,128,558
WET FILM GAUGE
Maynard R. Euverard, Richmond, Va., assignor to Interchemical Corporation, New York, N.Y., a corporation of Ohio
Filed Sept. 7, 1961, Ser. No. 136,501
5 Claims. (Cl. 33—169)

This invention relates to apparatus for determining the thickness of wet films of paints, lacquers, varnishes, plastic coatings and the like, and more particularly is directed to an improved construction for a wet film thickness gauge of the type as disclosed in my previous United States Patent No. 2,507,592.

In that patent, the gauge is comprised of a gauge body which includes three disc portions arranged in parallel spaced relation and separated each from the other by grooves. Two of the discs, preferably the outer ones are circular, coaxial and have the same diameter. The third disc, preferably located intermediate the other two discs, has a somewhat smaller diameter and its geometrical center is offset from the center of the other two discs and thus has an arcuate periphery regularly changing in distance from the axis of rotation of the two other discs and at one point along the same is tangent to the peripheries of the other two discs. The periphery of the third disc gradually decreases from this one point of tangency and constitutes the measuring surface of the instrument.

The preferred method of using the instrument is to place the three-disc body on the wet film surface to be gauged where the depth of the periphery of the third disc below the periphery of the other two discs is at a maximum and then roll the disc body toward the minimum depth point of the film. The point at which the periphery of the third disc begins to contact the wet film is noted after the instrument is removed. This point, corresponding to some particular depth in convenient units of measurement such as mils can then be read from a scale placed on the outer face of one of the two outermost discs.

While the instrument of my prior U.S. patent is most accurate so far as measurement of film thickness is concerned, it does present somewhat of a problem in reading the measurement since the operator is required to view across the peripheral surfaces of the discs and estimate the graduation mark that is exactly opposite the point of film pick-up on the third, measuring disc. Consequently, care is required in reading the instrument, and hence errors are possible in cases where the reading is not done with sufficient accuracy.

The purpose of the present invention is to provide an improved construction for wet film thickness measuring instruments operated in accordance with the principles of the instrument disclosed in my prior mentioned patent but which provides for a more accurate read-off of the film thickness, thus lessening the margin for reading error.

More particularly, the improved construction includes a rotatable scale plate having a pointer thereon at its periphery which projects into a position close to the periphery of the third disc which, as previously explained, constitutes the measuring surface. After the disc body has been rolled along the wet film to the point where some of the film surface is picked up on the periphery of the measuring disc, the instrument is removed from the film and the scale plate and pointer are then rotated so as to bring the pointer into a position directly opposite the point of film pick-up on the measuring disc. Film thickness is then read off the graduations on the scale plate at a point opposite a reference point provided on one of the two outer discs at the point of tangency of the periphery of the measuring disc with the peripheries of the other two discs which is, of course, the point where the film thickness would be zero.

The foregoing objects and advantages of the invention will become more apparent from the following detailed description of a preferred embodiment and from the accompanying drawings wherein:

FIG. 1 is a view of the improved gauge in side elevation; and

FIG. 2 is a view taken on line 2—2 of FIG. 1 with the upper half shown in section and the lower half in elevation.

With reference now to the drawings, which incidentally illustrate the gauge generally at double the scale at which it is preferably manufactured, the disc body is seen to be generally cylindrical and includes two outer disc portions 10, 10′ which are circular and which have the same diameter and also are concentric with respect to the central axis $x$—$x$. The disc portions 10, 10′ are of such width that they will readily penetrate a wet film when the instrument body is rolled over a wet film surface. Intermediate the two outer disc portions 10, 10′ is a third disc portion 11 the periphery of which constitutes the measuring surface of the instrument. As seen in FIG. 1, the periphery of disc portion 11 is tangent to the peripheries of the two outer discs 10, 10′ at only one point on the instrument and a reference mark such as line 12 is applied at this point along an outside face of one of the two outer disc portions 10, 10′. Proceeding in opposite directions from this point of tangency, the periphery of the measuring disc portion 11 gradually decreases until a minimum is reached at a point 180° away from the reference line 12 or point of tangency. Thus, in this particular embodiment, the periphery of the measuring disc is actually circular and its center of radius is displaced from the center of radius of the two outer disc portions 10, 10′ by an amount equal to one half the maximum distance $a$ between the peripheries of the discs at a point 180° away from the point of tangency of the peripheries.

The measuring disc portion 11 is preferably separated from the two outer disc portions 10, 10′ by circular grooves 13 which may be of any suitable depth below the periphery of the measuring disc. These grooves allow space from the film displaced by the disc portions 10, 10′ to accumulate without affecting the level of the film directly under the periphery of measuring disc portion 11.

The range of depth of film for which the gauge is to be used will, in general, dictate the optimum variations in the constructions of the instrument. For example, if film depths in the range of 0–4 units are to be measured, the maximum depth of the periphery of disc 11 below the peripheries of discs 10, 10′ will of course be 4 units. In the illustrated embodiment the depth of the periphery of measuring disc 11 below the peripheries of the two outer discs 10, 10′ varies as a cosine function. Thus at 60° away from the point of tangency, i.e. the zero thickness point which is at reference line 12, the depth will be one unit; at 90° it will be two units; at 120° it will be three units; and at 180° it will be four units. These units of measurement could be in mils or any other unit which may be desired.

As has been explained, the instrument is used by rolling it along the wet film, beginning at a point where the periphery of disc 11 is at a maximum below the peripheries of discs 10, 10′ (this will always be greater than the maximum wet film thickness to be measured) until the film touches the periphery of the measuring disc 11. To enable the gauge body to be rolled along the wet film, the body is bored axially and this bore is bushed with a bushing 14 which has a length slightly greater than the thickness of the gauge body. Inserted into the bushing 14 is an axle 15 which is threaded on both ends to receive cylindrical knobs 16 which constitute finger grips by which the instrument may be held comfortably between two fingers such as the thumb and forefinger and rolled along the wet film to be gauged. It will be noted from FIG. 2 that these knobs 16 when threaded tightly onto the threaded ends of axle 15 leave a small running clearance between the gauge body and the knobs.

In order to read the gauge, the present invention provides a scale plate 17 which is graduated in a manner to match the changing depth of the periphery of the measuring disc 11 below the peripheries of the outer discs 10, 11', i.e. a cosine manner, in opposite directions, from 0 to 4, the single scale graduation 4 being located 180° away from the scale graduation 0, the two graduations 1 being located 60° away from the zero point, the two graduations 2 being located 90° away from the zero point and the two graduations 3 being located 120° away from the zero point. Scale plate 17 includes a pointer 18 which extends over the periphery of disc portion 10' to a point adjacent the periphery of the measuring disc portion 11 so that the pointer can be brought in a most accurate manner exactly opposite the point where the periphery of disc 11 begins to pick up the wet film. Pointer 18 is aligned exactly with the 0 graduation on plate 17. Plate 17 can be made integral with one of the knobs 16 or it can be made as a separate element, as illustrated, and secured in place on axle 15 between one end of bushing 14 and the adjacent face of knob 16. The axle 15, knobs 16 and scale plate 17 rotate as a unit relative to the gauge body which includes the disc portions 10, 10' and 11.

In order to take a measurement of wet film thickness, the gauge body is rolled along the surface, starting at the point where the periphery of disc 11 is a maximum below the peripheries of discs 10, 10' and making certain of course that pointer 18 is elevated above the surface of the film. The rolling is continued until the periphery of the measuring disc 11 picks up the wet film. The gauge is then removed from the surface, whereupon scale plate 17 is rotated until pointer 18 is exactly opposite the point on the periphery of disc 11 where the film pick-up begins. Film thickness is then read off the graduations on plate 17 opposite the zero or reference line 12. For the position of pointer 18 shown on the drawing, the thickness of the wet film would approximately 3.45 units.

In conclusion, while I have described and illustrated a preferred mode for carrying out the invention, various modifications in the construction and arrangement of parts may be made without, however, departing from the spirit and scope of the invention as defined in the appended claims. For example, the gauge may be constructed in such manner as to measure film thicknesses which do not extend down to zero thickness as has been described in connection with the illustrated embodiment, i.e. to measure film thicknesses in a finite range such as from 4 to 8 units, or from 2 to 10 units, etc. With such constructions, it is obvious that the periphery of the third disc portion 11 would not be tangent with the peripheries of the two outer disc portions 10, 10' which, as explained, represents films of zero thickness, but rather would have a point of minimum depth below the peripheries of the two outer disc portions equal to the minimum thickness of film in the particular range measurable by the instrument, and the graduations on scale plate 17 would be correspondingly modified.

I claim:

1. A wet film thickness gauge comprising a composite body including first and second circular coaxial disc portions of the same diameter, a third disc portion having an arcuate periphery regularly changing in distance from the axis of rotation of said first and second disc portions and which constitutes the measuring surface, the periphery of said third disc portion having a point of minimum depth below the peripheries of said first and second disc portions with a lower limit of zero and a point of maximum depth below the peripheries of said first and second disc portions which exceeds the thickness of any film to be measured, one of said first and second disc portions being provided with a reference mark denoting that point on the periphery of said third disc portion which is at minimum depth below the peripheries of said first and second disc portions, and a scale plate rotatably mounted on said body for rotation about an axis coincident with the axis of said first and second disc portions, said scale plate being provided with a pointer element extending across the periphery of one of said first and second disc portions to a position adjacent the periphery of said third disc portion, said scale plate being provided with an arcuate scale of graduations beginning with said pointer element and which matches the regularly changing depth of the periphery of said third disc portion below the peripheries of said first and second disc portions.

2. A wet film thickness gauge as defined in claim 1 wherein said gauge body is mounted rotatably on a shaft which extends through a central bore in said gauge body and said scale plate is secured non-rotatably on said shaft.

3. A wet film thickness gauge as defined in claim 2 and which further includes knobs secured upon the opposite ends of said shaft by which to hold said gauge during the measuring operation.

4. A wet film thickness gauge as defined in claim 3 wherein the ends of said shaft are threaded to receive said knobs.

5. A wet film thickness gauge as defined in claim 4 and which further includes a bushing intermediate said shaft and gauge body, the ends of said bushing constituting stops for said knobs when screwed onto said shaft to establish a running clearance between said knobs and gauge body.

References Cited in the file of this patent

UNITED STATES PATENTS

| | | |
|---|---|---|
| 1,291,485 | Grover | Jan. 14, 1919 |
| 2,202,371 | Bruckman | May 28, 1940 |
| 2,507,592 | Euverard | May 16, 1950 |
| 2,546,990 | Euverard et al. | Apr. 3, 1951 |
| 2,773,437 | Knauf | Dec. 11, 1956 |
| 3,019,645 | Lake | Feb. 6, 1962 |